United States Patent [19]

Karklys et al.

[11] 4,104,542
[45] Aug. 1, 1978

[54] PROGRAM MODIFICATION CIRCUIT FOR ELECTRONIC APPLIANCE PROGRAMMER

[75] Inventors: Joseph Karklys; Junji Cary Yamanaka, both of St. Joseph, Mich.

[73] Assignee: Whirlpool Corporation, Benton Harbor, Mich.

[21] Appl. No.: 748,778

[22] Filed: Dec. 9, 1976

Related U.S. Application Data

[63] Continuation-in-part of Ser. No. 688,092, May 19, 1976, abandoned.

[51] Int. Cl.² ................... H01H 7/00; H01H 43/00
[52] U.S. Cl. .......................... 307/141; 307/141.4; 328/130
[58] Field of Search ............... 307/141, 141.4, 141.8, 307/293; 328/129, 130; 134/57 R, 57 D, 58 R, 58 D

[56] References Cited

U.S. PATENT DOCUMENTS

| | | | |
|---|---|---|---|
| 3,774,056 | 11/1973 | Sample et al. | 307/141 |
| 3,829,784 | 8/1974 | Eshraghian | 328/130 |
| 3,986,040 | 10/1976 | Karklys | 307/141 |

Primary Examiner—Robert K. Schaefer
Assistant Examiner—Eugene S. Indyk
Attorney, Agent, or Firm—Thomas E. Turcotte; James S. Nettleton; Anthony Niewyk

[57] ABSTRACT

An appliance programmer, in particular an automatic washer programmer, employs a memory circuit and a sequence control for establishing a predetermined program. Included in the program are a program modification circuit and a rapid advance circuit whose functions are respectively to automatically modify the program inherent in the programmer and to rapidly step the programmer through its operational program. The memory and sequence control of the programmer are designed so that, absent the program modification circuit, the programmer can effect only a single predetermined program. For this reason the program modification circuit has been designed to enable the programmer to effect other programs. The program modification circuit receives inputs from selected function display lights to indicate that a certain function is being performed and from one or more sensors to indicate that a function has been completed or a condition has been satisfied in the automatic washer. The program modification circuit then causes several of the frequency dividers in the frequency divider chain of a clock forming part of the programmer to be bypassed. This results in the shortening of the next predetermined time period which the clock is programmed to establish. Therefore, the operation which is then being performed is shortened in duration so that the function appears to be curtailed thus causing a modification of the predetermined program. In addition, the rapid advance which is provided allows for manually speeding up the functions of the programmer by stepping the programmer through its sequence of operations at a much faster rate than normal. This also allows the programmer to be tested rapidly for ease in servicing.

7 Claims, 6 Drawing Figures

PROGRAM MODIFICATION CIRCUIT FOR ELECTRONIC APPLIANCE PROGRAMMER

CROSS REFERENCE TO RELATED APPLICATION

This application is a continuation-in-part of our co-pending patent application Ser. No. 688,092, now abandoned, filed May 19, 1976, entitled "Program Modification Circuit For Electronic Appliance Programmer".

This application is also related to U.S. Pat. Nos. 3,986,040 and 4,001,599.

BACKGROUND OF THE INVENTION

1. Field of the Invention

This invention relates to an appliance programmer and is more particularly concerned with the provision of a circuit for modifying a predetermined program of an appliance.

2. Description of the Prior Art

Integrated circuit programmers for controlling the operation of appliances are well known in the art. In addition, integrated circuit programmers having program modification circuitry are known in the art. One such circuit is shown in U.S. Pat. No. 3,840,752 which discloses a programmer for an automatic washer wherein a bistable circuit causes the programmer to advance rapidly through preselected program steps in response to actuation of a manual switch and information derived from a shift register. In U.S. Pat. No. 4,001,599, a circuit is shown which, in response to the electrical potential on input terminals, alters the duration of selected program operations by selecting different clock output pulses.

SUMMARY OF THE INVENTION

In the manufacture of integrated circuit programmers, economies of scale can be achieved if a basis integrated circuit design can be used in a large number of programmers. Threfore, it is advantageous to use the same design for the integrated circuit in many different appliance models. Since these models may require different operating programs, circuits have been designed which can modify the basic program of such an integrated circuit programmer. One such circuit is described in my U.S. Pat. No. 4,001,599, referred to above.

An object of the present invention is to provide a novel circuit for an appliance programmer whereby the basic program may be modified.

A more particular object of the invention is to provide an appliance programmer comprising an integrated circuit for establishing a predetermined program which may be modified by an additional circuit. The additional circuit may be external or internal to the integrated circuit.

Another object of the invention is to provide an integrated circuit programmer wherein certain steps of a predetermined sequence can be deleted, thereby altering the program.

Yet another object of the invention is to provide a programmer which senses completion of certain functions in the appliance and which in response thereto and to a sequence indication from the programmer initiates skipping through a certain portion of the sequence. The programmer can therefore perform the same operations as before but, in response to the completion of a function and a signal from a sensor, can skip the remainder of that operation.

According to the invention, an appliance programmer, herein disclosed in the environment of an automatic washer, comprises a clock for supplying electrical pulses at discrete time intervals, a sequence control for establishing a sequence of appliance operations and a memory and output decoder circuit connected to the clock and to the sequence control for providing a sequence of output signals corresponding to the desired program. The clock is connected to a program modification circuit for receiving signals therefrom to alter the duration of predetermined time intervals for the operations.

The memory circuit includes an input memory for receiving program instructions from a plurality of manually operated control switches, a read only memory for generating output signals and an input encoder for encoding the information received from the input switches via the input memory to operate the read only memory.

The program modification circuit comprises a NAND gate which receives an input from a water level switch and from the 60 HZ oscillator which drives the clock and is conditioned by an output from one of the function display lights to cause the NAND gate to deliver 60 HZ output pulses when both the water level switch and the function display light give a particular indication. The 60 HZ pulse train from the oscillator is also fed directly to a series of frequency dividers, the outputs of which are used to establish the predetermined time intervals for the appliance operation. The output of the NAND gate is used to bypass certain of the divider stages which in effect shortens the predetermined time intervals.

In addition, a rapid advance circuit is provided which allows the operator to manually shorten the time intervals of the appliance programmer.

BRIEF DESCRIPTION OF THE DRAWINGS

Other objects, features and advantages of the invention, its organization, operation and construction will be best understood from the following detailed description taken in conjunction with the accompanying drawings of which.

DESCRIPTION OF THE PREFERRED EMBODIMENTS

Figure 1:
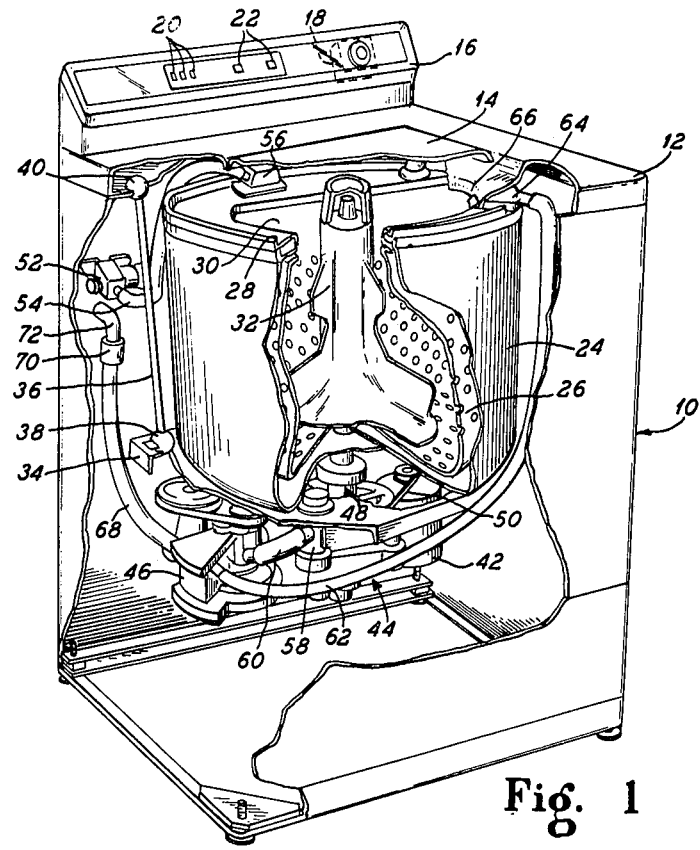
FIG. 1 is a perspective cutaway view of an automatic washer which may embody the programmer of the present invention.

The automatic washer, as illustrated in FIG. 1, comprises a cabinet 10 including a cabinet top 12 having a lid 14 and a console 16. The console 16 is provided with a programmer 18, a plurality of operative controls 20, and a plurality of indicator lamps 22 to control and monitor the operation of the washer. The operations controlled by the programmer include a washing operation in which the clothes are agitated to remove soil, a draining operation in which the washing liquid is removed from the machine, and a spinning or extracting operation in which the clothes are centrifuged to remove more liquid from the fabric.

A tub 24 has a concentric perforate basket 26 therein for receiving clothes to be washed. A tub ring 28 is provided to prevent splash from the washing action from flowing over the top of the tub. The tub ring 28 is provided with an opening 30 through which clothes are received into the basket 26. An agitator 32 is provided within the basket 26 to impart a washing action to the clothes.

The tub 24 is supported by a baseplate 34 which is suspended from the cabinet 10 by three suspension rods, rod 36 being the only such rod illustrated. Th rod 36 is connected to the baseplate 34 by a resilient member 39 and to the cabinet 10 by a resilient member 40.

A motor 42 and a transmission 44 are suspended from the baseplate 34 and provide a means for driving the agitator 32 and the basket 26. A valve pump 46 is provided to circulate the washing liquid during the washing operation and to remove the liquid from the tub 24 during the draining and spinning operations. A clutch and brake assembly indicated at 48 allows for the engagement of the agitator 32 for an oscillatory motion during the washing operation, while holding the basket 26 stationary, and for disengagement of the agitator 32 and engagement of the basket 26 for spinning of the basket during the spinning operation. The transmission 44, the pump 46 and the clutch and brake assembly 48 are driven by the motor 42 by means of a drive belt 50.

Water flows into the machine through a programmer controlled solenoid valve 52 through a conduit 54 and an antisyphon device 56 into the tub 24. During the washing operation, washing liquid is circulated from the tub 24 by suction from the valve to pump 46 through a button trap 58 and a conduit 60 and is pumped though a conduit 62 to a filter 64. The water flows through the filter where particles such as lint are removed and the filtered water flows through the discharge end of the filter into the basket 24 through the tub ring opening 30. The filter is mounted through a vertical flange 66 of the top 12 so as to overhang the opening 30. During draining of the tub 24, the pump valve is operated and wash liquid flows from the tub 24 through the button trap 58 and the conduit 60 to the pump 46. The wash liquid is then pumped through a conduit 68, a check valve 70 which allows flow of liquid in this direction only and a conduit 72 to a drain (not shown).

Figure 2:
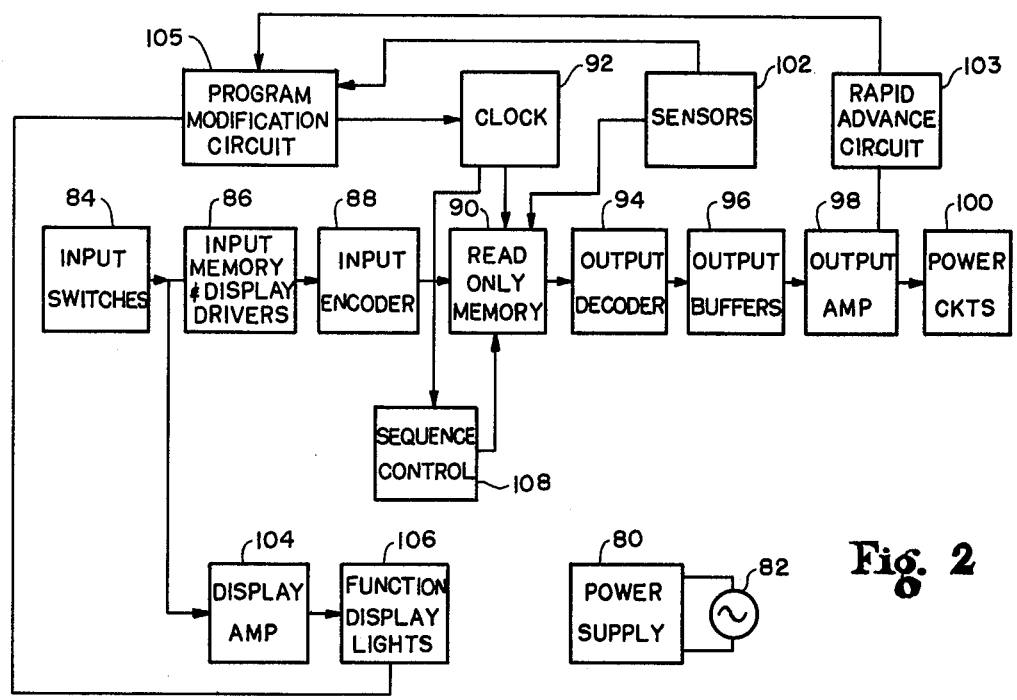
FIG. 2 is a schematic block diagram of a programmer constructed in accordance with the present invention.

Referring to FIG. 2, a schematic block diagram of the programmer 18 is generally illustrated as comprising a power supply 80 which is connected to a commercial, electrical supply 82, such as 120 volts AC, 60 HZ. The individual power connections to the individual circuits have been omitted for the sake of clarity. It is, however, well known in the art to generate a DC voltage from a commercial line supply. Input switches 84 are connected to an input memory which retains in storage the information entered with the input switches. The input switches give the operator several options to select from such as the wash bath tmperature and the agitation and spin speeds. The input memory is connected to an input encoder 88 which provides specified outputs for certain combinations of inputs. As an example, the input encoder may comprise a number of AND gates. The information from the input encoder is provided to a read only memory 90 which, by way of example, may comprise a matrix. The matrix, provides specified outputs only for predetermined combinations of inputs as is well known in the art. Therefore, for example, when a specific input switch has been depressed and the sequence control 108 provides a certain output and the clock 92 provides a clock pulse, the read only memory 90 will provide a specified output to an output decoder 94. The output decoder 94 is connected by way of output buffers 96 and output amplifiers 98 to a plurality of power circuits 100, hereinafter called output circuits, which perform various operations of the program including, by way of example, the opening and closing of the valves for filling and draining.

Figure 5:
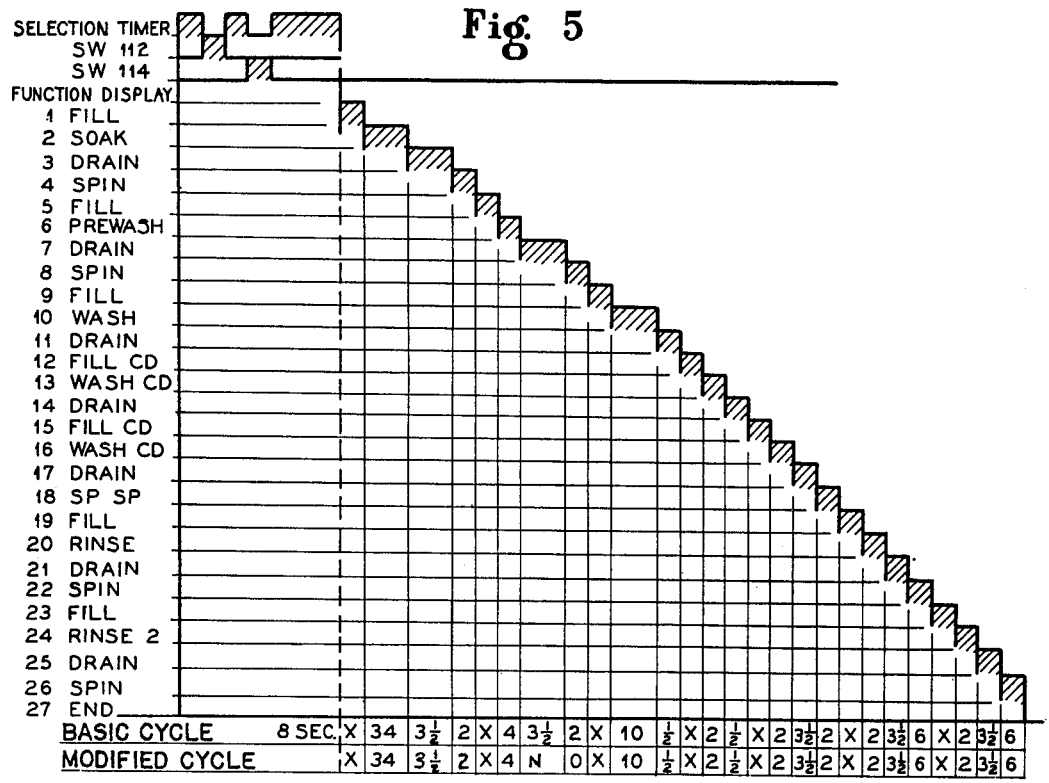
FIG. 5 is a program chart illustrating a predetermined program and program modification in accordance with the principles of the present invention.

The sequence control 108 is provided for establishing the sequence of steps in the operating cycle of the appliance as illustrated in FIG. 5. The sequence control can be constructed similar to that illustrated in the U.S. Pat. No. 3,662,186. The clock 92 generates electrical output pulses at discrete time intervals from a pulse source such as a commercial line supply of 120 volts, 60 HZ. The clock construction is well known in the art and may comprise the circuit described in U.S. Pat. No. 3,639,844.

The Read Only Memory also receives inputs from sensors 102 such as, for example, a water level switch which indicates that a desired water level has been established within the tub 24. As mentioned above, the Read Only Memory provides an output to an output decoder which decodes the information provided by the Read Only Memory and feeds the same to output buffers from which the information is routed to the output amplifiers and the power circuits which operate the appliance.

The automatic washer is also provided with function display lamps 106 which indicate the progression of the washing program. The function display lights are driven by display amplifiers 104 and receive their input signals from the input memory and display drivers circuit 86. The program modification circuit 105 is shown connected to the function display lights, the sensor circuit and the clock 92. As described in greater detail below, the program modification circuit automatically alters the basic cycle so that a modified cycle is generated.

In the embodiment illustrated in FIG. 2, function display lights 106 are energized by display amplifier 104 which receives its input from the display drivers associated with the input memory 86. The display lights 106 may advantageously comprise light emitting diodes, although other types of display lights may also be used. The function of the display lights 106 is to indicate which machine functions have been selected by the operator by means of the input switches, and also to indicate the progression of the washing program.

Figure 3:
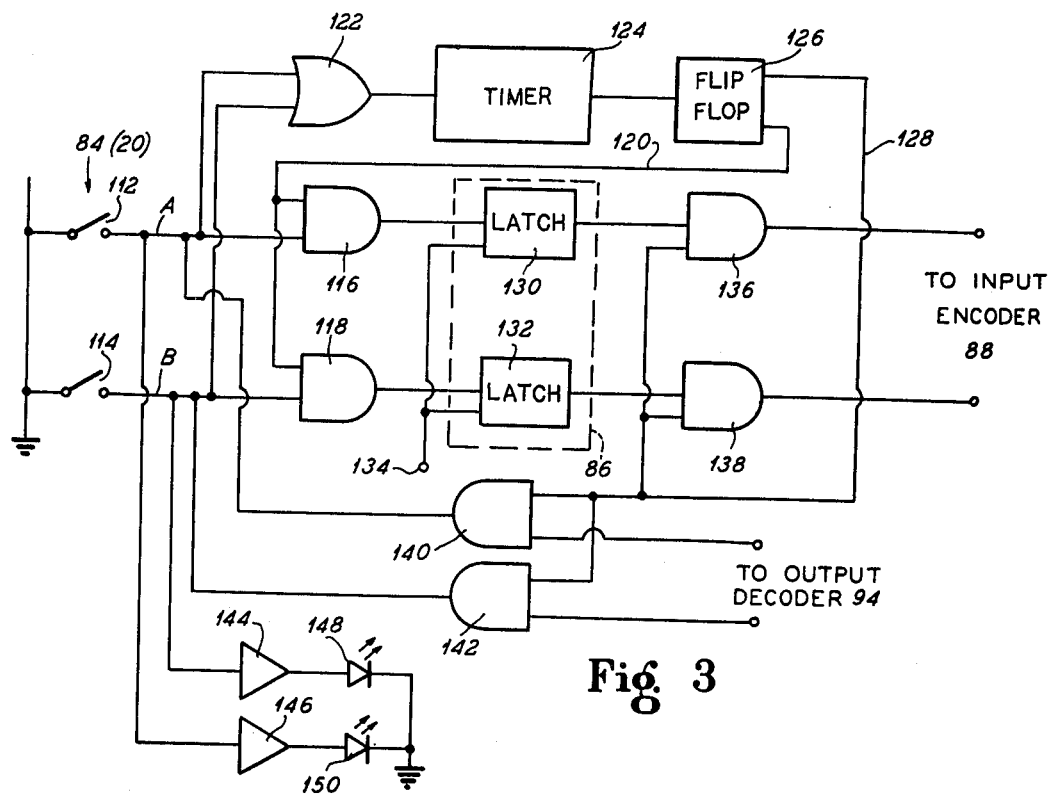
FIG. 3 is a schematic logic diagram of an operator controlled program modification circuit which may be employed in the circuit of FIG. 2.

Referring now to FIG. 3, apparatus for operator controlled manual alteration of the program at the beginning of the cycle is illustrated. Th purpose of this structure is to allow the operator a specified amount of time in which to modify the basic program and exercise available program options. Once the specified amount of time elapses, the programmer will lock out any further options selected by the operator. A timer is provided and each time the operator selects another option within the specified time, the timer is reset and begins counting anew toward the specified amount of time.

In FIG. 3 the input switches 84 have been illustrated in detail as comprising a pair of switches 112 and 114 which may be inexpensive momentary switches and which may be depressed by the operator to select specific options. By way of example, the operator may elect to skip specific steps in the program. By depressing the switches 112 and 114, respective inputs are applied to a pair of AND gates 116 and 118. The other inputs to these AND gates are connected to the flip-flop 126 and, until a reset pulse is received by a flip-flop 126, an output will appear which is fed to the gates 116 and 118. Therefore, the gates 116 and 118 will produce an output which is fed to a pair of latches 130 and 132. These latches represent the input memory 86 of FIG. 2 and include a "clear" input 134 which is energized at the beginning of the program cycle. This may be a reset pulse from the clock such as by way of a single shot flip-flop. The outputs of the latches are provided to two AND gates 136 and 138 which also receive inputs from the reset side of the flip-flop 136 by way of a connection 128. The switches 112 and 114 are also connected to an OR gate 122 which provides a pulse through a timer 124 whenever one of the switches 112, 114 is actuated. Therefore, the timer is reset each time one of the switches is actuated. If the timer is not reset for a period of 8 seconds, for example, the timer will provide an output pulse which will reset the flip-flop 126 and will disable AND gates 116 and 118 so that any further actuation of the switches 112 and 114 is locked out. At this time, however, the AND gates 136 and 138 are enabled by the signal on the reset output 128 of the flip-flop 126 to provide respective output pulses to the input encoder 88. The input encoder 88 processes this information to alter the basic predetermined program of the appliance. The flip-flop 126 also provides inputs for a pair of AND gates 140 and 142 which receive respective inputs from the output decoder 94. The gates 140 and 142 respectively drive the light emitting diodes 148 and 150 by way of amplifiers 144 and 146 to indicate the progression of the program. It should be noted that the diodes 148 and 150 are energized by way of time shared circuit connections to the integrated circuit. These connections include portions A and B which are time shared with the connections to the operator switches 112 and 114.

Figure 4:
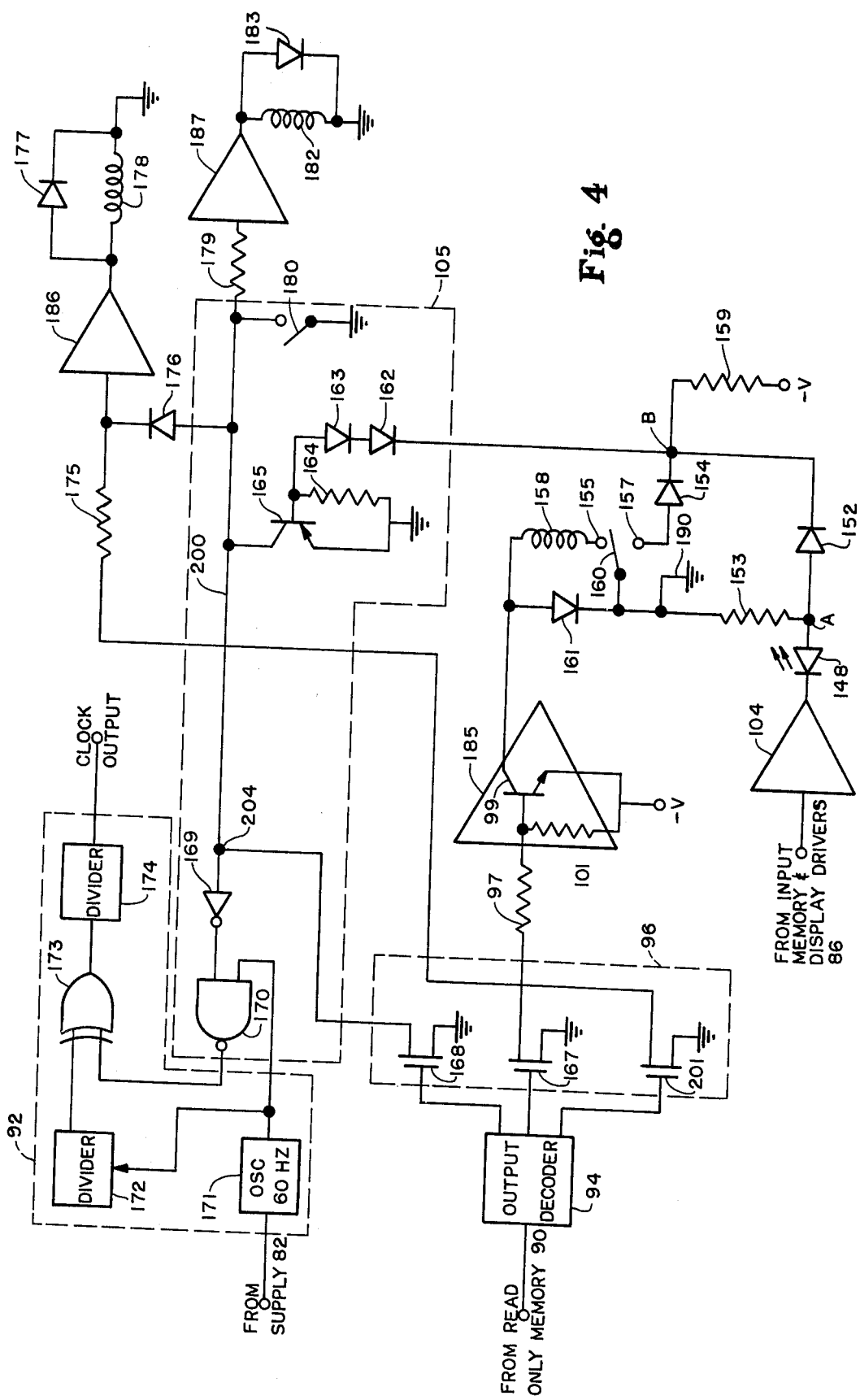
FIG. 4 is a schematic logic diagram of the program modification circuit and rapid advance circuit which may be employed in the circuit of FIG. 2.

Referring now to FIG. 4, the clock 92 has been shown in greater detail as comprising an oscillator 171 which receives its input from line voltage supply 82. Oscillator 171 may also comprise a pulse shaping circuit which uses the AC line frequency as the oscillator frequency. The output of the oscillator is fed to a chain of flip-flops 172 which divide the oscillator frequency. In addition, the output from the oscillator is fed to the input of a NAND gate 170. The output of flip-flop 172 provides an input for exclusive OR gate 173. The other input for exclusive OR gate 173 is derived from NAND gate 170. The output of gate 173 is fed to a set of flip-flops forming a divider 174 which further divide the frequency of the pulses. This divided frequency becomes the clock output so that pulses are provided at predetermined time intervals. By means of internal circuit connections between the flip-flops any desired time interval can be provided. Thus, a number of clock output pulses are available to time the various operations as illustrated in FIG. 5. A clock of this type is illustrated in U.S. Pat. No. 3,639,844 as mentioned above.

Three output buffers 167, 168 and 201 are shown which comprise the circuitry illustrated in block form by output buffer block 96 in FIG. 2. Output buffers 167, 168 and 201 comprise MOS field effect transistors or MOSFETS. Buffer 167 drives output amplifier 185 by means of resistor 97. Output amplifier 185 is typical of the output amplifiers labeled 98 in FIG. 2 and comprises an NPN transistor 99 together with a resistor 101 which biases the base thereof. The junction between the resistor 101 and the emitter of the transistor is connected to a negative source of voltage which is derived from the power supply 80. The output amplifier 185 drives a water fill valve solenoid coil 158 which is connected in parallel with a commutating diode 161. A single pole double throw switch 160 is shown with its switchblade connected to a fixed source of reference potential 190, here illustrated as ground, and with one of its fixed contacts 155 connected to the solenoid 158. The other fixed contact 157 of switch 160 is shown connected to the anode of a diode 154. The cathode of the diode 154 is shown connected to the cathode of a diode 152 whose anode is connected to a resistor 153. The other end of the resistor 153 is connected to ground. The junction of resistor 153 and the anode of diode 152 is connected to the anode of a light emitting diode 148 whose cathode is connected to a display amplifier 104. The display amplifier 104 derives its input signal from the input memory 86 as explained above.

It should also be noted that the circuit deenergizes the water fill valve solenoid in two ways. The first disconnect function is accomplished by the water level switch 160. The second disconnect function is accomplished by the programmer when it stops sending an energization signal to the output buffer for the fill valve solenoid. Therefore, if either the programmer or the water level switch malfunctions, the fill valve solenoid will still be de-energized to prevent flooding of the automatic washer.

The junction of the cathodes of diodes 152 and 154 is connected to a negative source of potential by means of resistor 159. This junction is also connected to one cathode of the series connected diodes 162 and 163. The anode of diode 163 is connected to the base of transistor 165. The base of the transistor is also connected to ground by means of a resistor 164. The transistor is of the PNP type and has its emitter connected to ground as well. The collector of the transistor is connected to the source of the main relay output buffer 168. The source of the main relay buffer 168 is also connected to an output amplifier 187 by means of a resistor 179. The output amplifier 187 is similar in construction to output amplifier 185. The output of amplifier 187 is used to drive the main relay solenoid coil 182 which is connected in parallel with a commutating diode 183. The parallel combination of the solenoid and the diode is connected to ground.

The source of field effect transistor 168 is also connected to ground by means of a switch 180 and to the anode of diode 176 whose cathode is connected to the input of the output amplifier 186 which drives the spin solenoid 178.

The output amplifier 186 is similar in construction to amplifier 185 and is driven from output buffer 201 by means of a resistor 175. Spin solenoid 178 is connected in parallel with a commutating diode 177 and the combination is connected to ground. It should be noted that solenoids 158, 178 and 182 could be replaced by a/c operated solenoids. If this were done they could be driven by means of bi-directional semiconductor devices such as triacs.

The circuit operates as follows. With reference to FIG. 5 it can be seen that during Step No. 5 the tub is filled, during Step No. 6 agitation takes place during a function entitled "pre-wash" and, during Step No. 7 the tub is drained and during Step No. 8 the basket is spun to centrifugally spin the remaining water from the clothes load. During steps 5, 6, 7 and 8, the function display light 148 is energized thus indicating to the operator that the prewash function is taking place. When the wash tub is filled with water, switchblade 160 touches contact 157. Since the anode of diode 154 is now connected to ground and its cathode is connected, by way of resistor 159, to a source of negative potential, the diode 154 will conduct. Point B will therefore be virtually at ground potential. Function display light 148 is energized and point A will therefore be below ground potential. Diode 152 is therefore back biased, and cannot conduct. Diodes 162 and 163 cannot conduct as the voltage drop across diodes 162, 163 and resistor 164 would exceed the voltage drop across diode 154. Therefore, transistor 165 cannot conduct and the potential on line 200 will be established by the other components in the circuit. However, during Step 7 the tub is drained and at a certain point the switch 160 will reset and the switchblade will contact fixed contact 155. Diode 154 will therefore no longer conduct and diode 152 will begin to conduct as the potential at point B drops to a negative value. If function display light 148 were not energized, however, the voltage at point A would be higher at this time, namely slightly below ground, so that point B would also be at a voltage slightly below ground due to the conduction of diode 152. Under those conditions, diodes 162 and 163 could not conduct. However, if function display light 148 is energized, the voltage at point B will be much lower because the voltage at point A is negative. Therefore, the two diodes 162 and 163 conduct thereby turning on transistor 165 and lowering the voltage on line 200. The drop in voltage on line 200 is inverted by inverter 169 so that a high input appears on one of the inputs of NAND gate 170. Therefore, the pulses from oscillator 171 will cause the output of NAND gate 170 to oscillate at the 60 HZ rate, thereby bypassing the pulse train emanating from flip-flops 172 and speeding up the clock output pulses. This, in turn, will cause the programmer to quickly step through the remainder of the drain period and the spin function as well. Therefore, the modified cycle will appear as shown in FIG. 5 with the time N being dependent upon the rate at which the tub is drained and the level to which the tub was filled.

The voltage drop across MOSFET 168 is insufficient to cause the gate 170 to toggle. It should also be noted that resistor 153 is of small enough value, typically 1000 OHMS, so that the potential at point A is more positive than the potential at point B when display light 148 conducts.

It can therefore be seen that by virtue of the program modification circuit, the predetermined program is automatically altered so that the tub is not completely drained of water in Step 7 and the spin operation of Step 8 is skipped. This occurs in response to the information from the function display light 148 and the water level switch. The circuit therefore automatically modifies the program cycle, without any operator control. The circuit is extremely simple in that only a single transistor and some diodes are used. The circuit can easily be incorporated into the integrated circuit or can be retained as an add-on external circuit.

Manual switch 180 is provided so that the potential on line 200 can be grounded manually and, therefore, the entire program of the programmer can be stepped through rapidly. This is especially useful when the programmer needs servicing or during checkout of the automatic washer. Diode 176 is provided so that when line 200 is grounded, diode 176 conducts thereby taking away the drive from output amplifier 186. The spin solenoid 178, therefore, cannot be actuated and will not chatter while the programmer quickly steps through the spin function. Diode 176 may not be needed if the accelerated spin period is sufficiently short or if the spin solenoid 178 is sufficiently slow in reacting to activation voltages. The reason for selecting the input line 200 for connection to the switching transistor 165 and switch 180 is that during any operation of the programmer, this line will be energized and available as the main relay needs to be energized.

Figure 6:
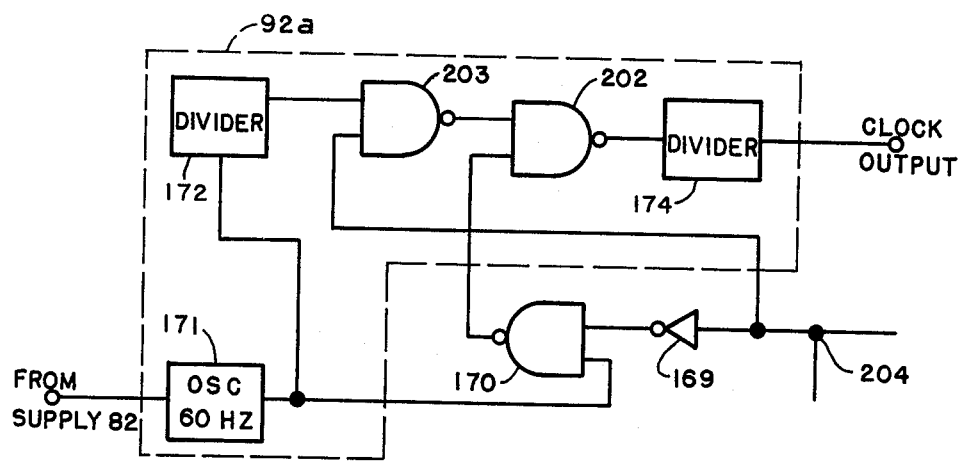
FIG. 6 is another embodiment of the clock and a portion of the program modification circuit.

FIG. 6 shows another embodiment of the clock 92A wherein the exclusive OR gate 173 has been replaced by two NAND gates 202 and 203. The circuit 92A connects to the circuit of FIG. 4 at point 204.

Circuit 92A operates as follows: When no rapid advance is desired, point 204 is high. Gate 170, therefore, has a low input and will have a continuous high output. When rapid advance is desired and point 204 goes low, the output of gate 170 will oscillate between high and low at the oscillator rate of 60 HZ. Due to the low voltage at point 204, gate 203 will produce a continuous high output. The output of gate 202 will therefore oscillate at the 60 HZ rate, thereby rapidly skipping through the undesired functions.

Although we have described my invention by reference to a particular illustrative embodiment, many changes and modifications of the invention may become apparent to those skilled in the art without departing from the spirit and scope of the invention.

We, therefore, intend to include within the Patent all such changes and modifications as may reasonably and properly be included within the scope of our contribution to the art.

Having described the invention, the embodiments of the invention in which an exclusive property or privilege is claimed or defined as follows:

1. An automatic washing appliance including an electronic control for stepping the appliance through an operating program comprising a sequence of operations,
    a clock for supplying electrical pulses at discrete timer intervals,
    a sequence control for establishing said sequence of operations,
    a memory circuit connected to said clock and said sequence control for generating a sequence of output signals,
    a plurality of output circuits connected to said memory circuit for performing said operations in response to said output signals, and
    sensing means connected to said memory circuit for generating a sensing signal indicating a condition of the appliance,
    an improved program modification means connected to said output circuits, said sensing means and said clock for modifying the length of at least one of said discrete time intervals, comprising:

switching means and a gate and responsive to said sensing signal for modifying said operating program, said sensing means comprising a water level sensing switch for generating a signal indicative of the water level in said washing appliance.

2. An appliance according to claim 1, wherein one of said output circuits comprises a plurality of appliance function indicators and said program modification means is responsive to the condition of one of the function display indicators.

3. An appliance according to claim 1, wherein the clock comprises an oscillator and a chain of frequency dividing stages and wherein said modification means causes several of the dividing stages to be bypassed.

4. An appliance according to claim 1 and including a manual speed-up circuit comprising a switch which, in its activated position, enables a programmer to step through its entire operating program at high speed.

5. An automatic washing appliance including a wash tub and an electronic control for stepping the appliance through an operating program comprising a sequence of operations,
- a clock for supplying electrical pulses at predetermined discrete time intervals,
- a sequence control for establishing said sequence of appliance operations,
- a memory circuit connected to said clock and said sequence control for generating a sequence of output signals,
- a plurality of output circuits connected to said memory circuit for performing said operations in response to said output signals,
- water level sensing means connected to said memory circuit for generating a signal indicative of the water level in the tub,
- an indicator circuit connected to said memory circuit for providing an indication of the operation which is being performed by the appliance, an improved
- program modification means connected to at least one of said output circuits comprising: switching means and a gate and responsive to said sensing signal whereby said operating program may be modified by accelerating at least one of said operations in said sequence, said switching means comprising a PNP transistor, the collector of which is connected to an input of the gate and the base of which is connected to the water level sensing means and the emitter of which is connected to a fixed source of reference potential, and said clock comprising an oscillator and a chain of frequency dividing stages, and wherein said gate receives an input from the water level sensing means and the oscillator and wherein the output of the gate is fed to one of the frequency dividers.

6. The appliance according to claim 5, wherein the switching means is bypassed by a manually operated switch.

7. The appliance according to claim 5, wherein the clock comprises an oscillator, a chain of frequency dividers and two NAND gates, said gate being connected to receive an input from the water level sensing means and the oscillator, and said NAND gates being connected to allow at least one frequency divider to be bypassed when an input is received from said water level sensing means during a predetermined operation.

* * * * *